July 20, 1954  C. K. AUVIL  2,684,472
REMOTE-CONTROL DEVICE
Filed Jan. 10, 1949  4 Sheets-Sheet 1

INVENTOR.
CARROLL K. AUVIL,
BY
ATTORNEYS.

July 20, 1954

C. K. AUVIL 2,684,472

REMOTE-CONTROL DEVICE

Filed Jan. 10, 1949

INVENTOR.
CARROLL K. AUVIL,
BY
ATTORNEYS.

July 20, 1954  C. K. AUVIL  2,684,472
REMOTE-CONTROL DEVICE
Filed Jan. 10, 1949  4 Sheets-Sheet 3

INVENTOR.
CARROLL K. AUVIL,
BY
ATTORNEYS.

July 20, 1954

C. K. AUVIL 2,684,472

REMOTE-CONTROL DEVICE

Filed Jan. 10, 1949

INVENTOR.
CARROLL K. AUVIL,
BY
ATTORNEYS.

Patented July 20, 1954

2,684,472

UNITED STATES PATENT OFFICE 2,684,472

REMOTE-CONTROL DEVICE

Carroll K. Auvil, Mineral, Wash.

Application January 10, 1949, Serial No. 70,094

3 Claims. (Cl. 340—171)

This invention relates broadly to an improved means and method for communicating intelligence by the use of electrical signals having a frequency of the order of audio-frequency signals. Various systems have heretofore been proposed in which variations in the frequency of such a signal have been employed for purposes of effecting a remote control, for telemetering, and for the communication of intelligence in general. Prior systems of this kind of which I am aware have been open to several objections among which may be noted their employment of heavy and complicated apparatus and relatively broad frequency bands. In many situations, as in the remote control of model airplanes or guided missiles for example, excessive weight is a disadvantage. In the same or in other situations, wide frequency bands may objectionably limit the number of audio-frequency signals which can be transmitted by a single carrier.

It is therefore an object of this invention to provide a simple apparatus employing variations in the frequency of an electric signal for telemetering, for remote control, or for otherwise communicating intelligence. Another object of the invention is to produce an apparatus which will be highly sensitive to small variations in frequency, which may therefore possess a wide range of operation under the control of frequencies lying within a narrow band, and which will not be objectionably sensitive to variations in the amplitude or to harmonic distortion of the transmitted signal. A further object is to produce an improved current-controlling device which will respond promptly and with a high degree of sensitivity to variations in the frequency of a controlling signal. Another object of my invention is to provide an improved current-responsive device for effecting mechanical movements. Still another object of the invention is to provide a system which will not be adversely affected by harmonic distortions or amplitude variations in the controlling signal.

My invention involves the expedient of controlling the current in an electron discharge device jointly by two cyclical electrical signals having a frequency of the order of audio-frequency signals. One of such signals is a control signal to variations in the frequency of which the apparatus is to be responsive. Conveniently, the two signals are impressed respectively on the control and screen grids of a tetrode or pentode, so that the potential of each grid can limit plate current to a minimum irrespective of the potential on the other grid. As a result, the electron discharge device will pass plate current only during intervals when both grids are above their respective cut-off potentials. If the two signals are of the same frequency, their successive waves will possess a uniform phase relation, and the duration of each interval in which plate current flows will be constant. However, if the control signal undergoes a slight change in frequency, a progressive wave-to-wave change in phase relation will occur, the duration of the current-passing intervals will change progressively, and the average plate current will either increase or diminish. Means responsive to the change in plate current is provided for causing the frequency of the second signal to be brought into agreement with the new frequency of the control signal. The same current-responsive means or another may be employed to indicate the changed frequency or to perform other functions. To prevent amplitude-variation or distortion of the transmitted signal from adversely affecting response, the transmitted signal is not itself used as the control signal; but instead the control signal is the output of a local oscillator capable of following changes in the frequency of the transmitted signal.

The accompanying drawings illustrate my invention:

Fig. 10$a$ is a view similar to Fig. 8 showing mechanical mechanism suitable for use in conjunction with the system of Fig. 10.

Figure 1:
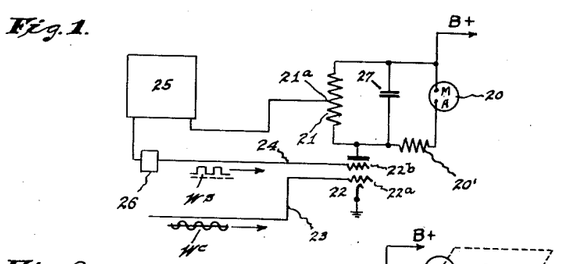
Fig. 1 is a diagrammatic view illustrating the receiving station of a system especially adapted for telemetering.

The apparatus illustrated in Fig. 1 is a receiver particularly suited for telemetric purposes. It comprises a milliammeter 20, which constitutes the remotely controlled telemetric indicator, connected in parallel with a resistance 21 in the plate circuit of an electron discharge device 22. Desirably, a resistance 20' is connected in series with the milliammeter 20. The electron discharge device embodies a pair of grids 22a and 22b, which conveniently, but not necessarily, are the nominal control grid and nominal screen grid of a single tetrode or pentode, but both of which function as control grids in the apparatus illustrated. The grid 22a is connected to a conductor 23 transmitting a cyclical signal $W_c$ the frequency of which varies with the variable whose value is to be indicated by the milliammeter 20. The grid 22b of the tube 22 is connected to a conductor 24 which transmits a cyclical signal $W_s$ locally generated, as by an oscillator 25, and impressed on the conductor 24 through an isolator 26. The oscillator 25 is of a type such that the frequency of the signal it creates will vary with a voltage impressed upon it. It is assumed herein that the frequency of the signal generated by the oscillator 25 varies in the same sense as does the controlling voltage, but that is not essential. In the apparatus shown in Fig. 1, the controlling voltage is that existing at a point 21a along the resistance 21. A condenser 27 connected in parallel with the resistance 21 and the milliammeter 20 may be employed to smooth out fluctuations in the plate current of the tube 22. Apparatus suitable for generating the audio-frequency signals $W_c$ and $W_s$ will be described in detail hereinafter. The signals $W_c$ and $W_s$ are indicated in Figs. 1 to 4 as of sine-wave and square-wave form respectively; but while this is desirable in some instances, it is not at all essential in the practice of my invention.

Figure 2:
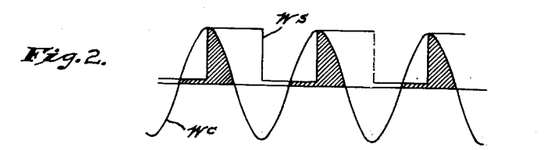
Figs. 2, 3, and 4 are curve diagrams drawn to the same time scale illustrating the effect of changes in signal frequency.
Figure 3:
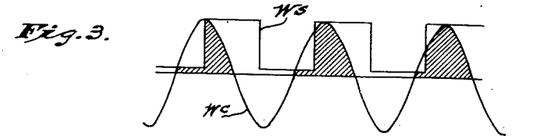
Figure 4:
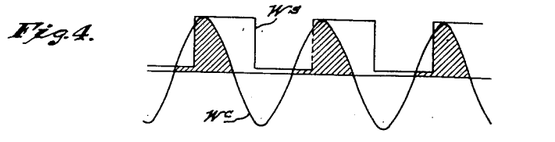

Figs. 2, 3, and 4 are horizontally co-ordinated views illustrating the effects of changes in the frequency of the signal $W_c$. In all three figures, it is assumed that the cut-off potential of both grids 22a and 22b coincides with the horizontal axis of the curve $W_c$.

Fig. 2 illustrates a stable-state condition existing when the frequency of the signal $W_c$ is constant and equal to the frequency of the locally generated signal $W_s$. The area of each of the shaded regions of Fig. 2 constitutes a measure of the quantity of electricity flowing in the plate circuit of the tube 22 at each cycle; and the aggregate area of the shaded regions for unit time is a measure of the average plate current. The signal $W_c$ is shown as leading the signal $W_s$; and, as a result, if the frequency of $W_c$ decreases slightly a progressive wave-to-wave decrease in phase displacement of the two signals will occur to cause an increase in the current flowing in the plate circuit of the tube 22. This condition is illustrated in Fig. 3, from which it will be evident that the shaded regions progressively increases in area from wave to wave of the signal $W_c$. As current in the plate circuit increases, the potential at the point 21a decreases to decrease the frequency of the signal $W_s$; and eventually a new condition of equilibrium is attained at which the frequencies of $W_c$ and $W_s$ will again equal each other. This condition is illustrated in Fig. 4, which shows that the two signals, although now of the same frequency, have a different phase relationship from that illustrated in Fig. 2. This change of phase relationship results in an increase in the area of the shaded regions corresponding to an increase in plate-circuit current just sufficient to drop the potential at the point 21a to a value which will result in coincidence between the frequencies of $W_c$ and $W_s$.

In similar manner, if the frequency of the control signal $W_c$ is increased, the lead of its successive waves will increase, plate-current will decrease, and the potential at point 21a will increase until the frequency of $W_c$ matches that of $W_s$ to establish a new stable-state condition.

From the above, it will be obvious that the plate current of the tube 22 is a function of the frequency of signal $W_c$. It will also be obvious that as the current flowing in the milliammeter 20 bears a constant ratio to total plate current, the reading of the milliammeter will likewise be a function of the frequency of $W_c$. If the frequency of $W_c$ is caused to vary with some variable quantity, the reading of the milliammeter 20 becomes a measure of the variable.

The function of the resistance 20' is to decrease the fraction of plate current which flows through the milliammeter and hence to increase the magnitude of the frequency-controlling potential variations which occur at the point 21a. The magnitude of potential variations at the point 21a will also be affected by the location of that point along the resistance 21; and in consequence it is possible, by shifting the point 21a, to vary the effect of a change in the frequency of the signal $W_c$ upon the reading of the milliammeter. The condenser 27 should possess a capacity large enough to prevent current through the resistance 21 from dropping to zero in the interval between successive periods in which $W_c$ and $W_s$ are both positive; but if its capacity is large enough to prevent the voltage at the point 21a from rising with adequate speed upon a decrease in plate current caused by an increase in the frequency of the control signal, supplementary equipment will be required if the system is to respond properly to a maximum increase in the frequency of the control signal.

Figs. 5 to 8 illustrate a remote-control system operating on the same general principle as that employed in the apparatus of Fig. 1. The remote-control system embodies a transmitting station (Fig. 5), from which control is to be exercised, and a receiving station (Fig. 6), at which are located the elements to be controlled. For each of the controlled elements there is an electron discharge device, shown in Fig. 6 as a pentode 22', corresponding in function to the tetrode 22 of Fig. 1. Each pentode 22' has grids 22a and 22b, the respective potentials of which jointly control plate current, and mechanism responsive to changes in plate current is provided for moving the associated controlled element.

Figure 5:
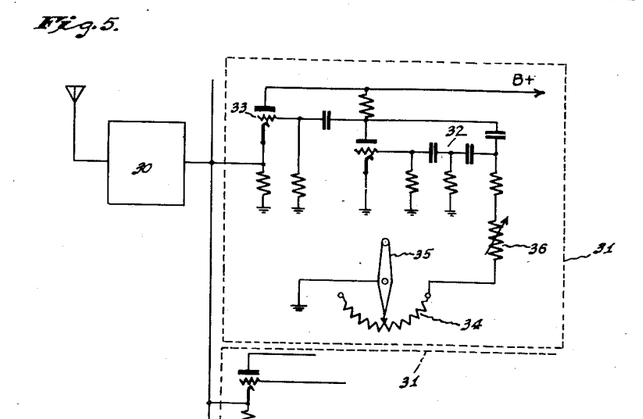
Figs. 5 and 6 are diagrammatic illustrations respectively showing the transmitting station and the receiving station of a remote-control system.

The apparatus at the transmitting station, illustrated in Fig. 5, comprises a radio transmitter 30 the output of which is modulated by the signal or signals produced by one or more control units 31. Each of such control units comprises an oscillator 32 the output of which is supplied through an isolation tube 33 to the radio transmitter 30. The oscillator 32 is conveniently of the resistance-capacity, phase-shift type and includes in its plate circuit a frequency-controlling potentiometer 34 adjusted by a movable control member 35 the movements of which are to be reproduced or followed by a controlled member at the receiving station. In addition to the potentiometer 34, the plate circuit of the oscillator 32 desirably includes a small variable resistor 36 employed for trimming purposes.

Figure 6:
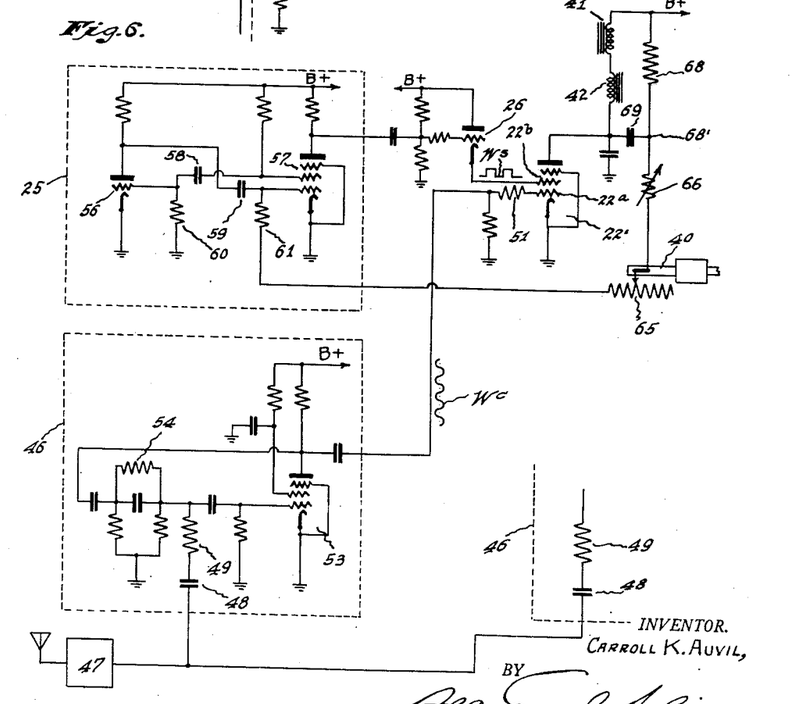

At the receiving station, illustrated in Fig. 6, I provide a movable controlled member 40 for each of the control units 31 at the transmitting station. The apparatus herein described functions to cause the controlled member 40 to reproduce or follow the movements of the corresponding control member at the transmitting station. Movement of the controlled member 40 is effected through the medium of an electromagnetic device, indicated in Fig. 6 as a pair of electromagnets 41 and 42, connected in the plate circuit of the pentode 22'. One specific form of means for moving the controlled member 40 is set forth hereinafter; but in its broader aspects, my invention comprehends any mechanism capable of moving the controlled member 40 in one direction upon an increase in the plate current of the pentode 22' and in the opposite direction upon a decrease in such current.

The pentode 22' corresponds in function to the tetrode 22 of Fig. 1, its plate current being controlled jointly by the respective potentials of the grids 22a and 22b. As in Fig. 1, the grid 22b has impressed upon it a signal ($W_s$) generated by a local oscillator 25. Desirably, the control signal ($W_c$), which is impressed on the other grid 22a, is the output of a second local oscillator 46 capable of departing to a limited extent from its nominal, freely oscillating, frequency under the influence of an exteriorly generated frequency imposed upon it. Conveniently, the oscillator 46 is of the resistance-capacity, phase-shift type in which a portion of the output of a tube 53 is fed back to the grid of such tube through a series of condensers. The parameters of the oscillator 46 are such that its nominal, or freely operating frequency, is approximately equal to one midway between the minimum and maximum frequencies generated by the corresponding control unit 31 at the transmitting station. The receiving station embodies a radio receiver 47 which is tuned to the frequency of the transmitter 30 and the signal-frequency output of which is impressed desirably through a blocking condenser 48 and an isolating resistor 49 upon each of the oscillators 46 at the receiving station. The output of the oscillator 46 is impressed, desirably through a resistor 51, upon the control grid 22a.

As previously indicated, the oscillator 46 is capable of departing to a limited extent from its nominal frequency under the influence of a slightly different frequency impressed upon the control grid of the electron tube 53 forming part of such oscillator. The tendency of the oscillator 46 to lock in with an impressed frequency may be increased by reducing the effective figure of merit of the oscillator circuit, which result can be accomplished in an oscillator of the type shown by the use of a resistor 54 connected as indicated in Fig. 6. It will be understood that the receiving station embodies one oscillator 46 for each of the control units 31 at the transmitting station and that the nominal frequencies of the several oscillators 46 will respectively approximate the mean frequencies generated by the control units 31. As a potentiometer 34 at the transmitting station is adjusted to vary the frequency of the signal generated by the control unit, the transmitted signal, impressed at the receiving station through the condenser 48 and resistor 49 on the corresponding oscillator 46, will cause corresponding variations in the frequency of the output of such oscillator. Variation in the output amplitude of the oscillator 46 due to variations in the frequency of the incoming signal can be reduced by connecting the resistance 49 to the grid of the tube 53 through one of the condensers in the feed-back circuit rather than directly. To reduce interference between the several oscillators 46 at the receiving station, the resistor 49 should possess a resistance equal to several times the output impedance of the receiver 47. Preferably, the resistance of the resistor 49 should be at least ten times the output impedance of the receiver.

The oscillator 25 is conveniently a multivibrator, shown as embodying a triode 56 and a pentode 57, condensers 58 and 59, and resistors 60 and 61. As is well known, the characteristics of the output of a multivibrator such as is shown in Fig. 6 can be varied by varying the capacities of the condensers 58 and 59 and the resistances of the resistors 60 and 61. Desirably, these parameters are selected so that the output of the oscillator 25 will have the approximate symmetrical wave form indicated at $W_s$ in Figs. 2 to 4. The nominal frequency of the oscillator 25 is substantially the same as the nominal frequency of the associated oscillator 46, but is subject to variation under the control of a potentiometer 65 responsive to movements of the controlled member 40 and connected in series with one of the resistors 60 and 61. An adjustable resistor 66, serving as a trimming resistance, is conveniently provided in series with the potentiometer 65. As previously indicated, the output of the oscillator 25 is impressed, desirably through a cathode follower isolation tube 26, upon the grid 22b, of the pentode 22'.

It will be obvious that in the apparatus of Fig. 6 the current flowing through the electromagnets 41 and 42 will be under the joint control of the voltages respectively impressed upon the grids 22a and 22b of the pentode 22'. In somewhat the same manner as is illustrated in Figs. 2 to 4 and above described, a change in the frequency in the signal impressed on the grid 22a will cause a change in the current flowing through the electromagnets 41 and 42. By mechanism hereinafter described, the change in the current flowing through the magnets 41 and 42 will cause movement of the controlled member 40, and the movement of the controlled member will in turn adjust the potentiometer 65 to bring the frequency of the oscillator 25 into agreement with that of the signal impressed on the grid 22a.

While the operation of the system shown in Figs. 5 and 6 resembles that shown in Fig. 1 in that differences in frequencies between a control signal and a local signal respectively impressed on two control grids of an electron discharge device cause the frequency of the local signal to match that of the controlling signal, there are some differences in mode of functioning between the two systems. As brought out in Figs. 2 to 4, a different plate current and a different phase relationship of the two signals $W_c$ and $W_s$ exist in the apparatus of Fig. 1 for each stable-state condition in which the frequencies of the two signals are matched. In the system of Figs. 5 and 6, however, substantially the same plate current exists for all stable-state conditions; since any departure of the plate current from its normal value would cause the electromagnets 41 and 42 to operate, move the movable controlled member 40, and adjust the potentiometer 65 to alter the frequency of the oscillator 25. Some change in phase relationship of the signals will occur in the system of Figs. 5 and 6 since the average plate current, which controls the magnets 41 and 42, is a function of both the frequency and the quantity of electricity flowing per cycle in the plate circuit. In order for average plate current to remain the same in different stable-state conditions, the lead of $W_c$ over $W_s$ will be less at lower stable-state frequencies than it will at higher stable-state frequencies. Because of the effect of the potentiometer, however, the change in phase-relationship will be much less than that occurring in the system of Fig. 1.

Figure 7:
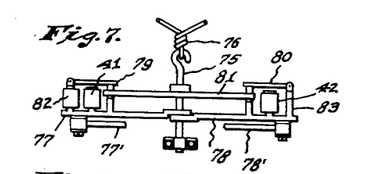
Figs. 7 and 8 are respectively a plan and an elevation illustrating one mechanism by which mechanical movement may be reproduced at the receiving station shown in Fig. 6.
Figure 8:
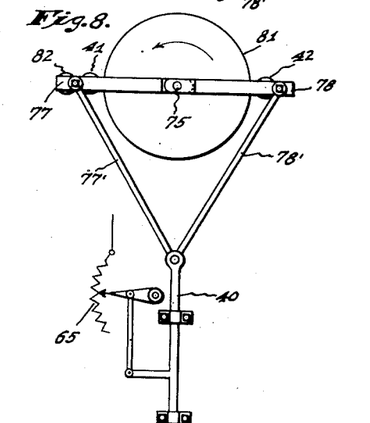

In Figs. 7 and 8 I have illustrated one form of mechanism which might be used to effect movement of the controlled member 40 in response to variations in the current flowing through the electromagnets 41 and 42. Such mechanism comprises a rotatably supported shaft 75 to which a substantially constant, uni-directional torque is applied. When the system is employed for controlling gasoline-powered model airplanes, the torque applied to the shaft 75 may be derived from a twisted rubber band 76. Loosely mounted on the shaft 75 are a pair of frames 77 and 78 which respectively support the electromagnets 41 and 42. Such magnets have respectively associated with them brake mechanisms 79 and 80 which co-operate with a disk 81 rotatable with the shaft 75. The arrangement is such that when either brake is engaged its associated frame 77 or 78 is clamped to the disk 81 and tends to rotate therewith. The brake mechanism 79 is controlled jointly by the electromagnet 41 and a second electromagnet 82 supplied with a constant current. A fixed magnet could be substituted for the electromagnet 82 if desired. The arrangement is such that the two magnets 41 and 82 exert opposite effects on the brake mechanism 79, with the effect of the magnet 82 predominating over that of the magnet 41 to hold the brake 79 engaged whenever the current in the magnet 41 is at or below its normal value. The magnet 42 acts to hold the brake 80 in engagement whenever the current in it is at or above the normal value. The frame 77 and 78, which include portions of non-magnetic material such as may be necessary to isolate the magnetic circuits, are individually connected by links 77' and 78' to the controlled member 40 which is in turn connected in any appropriate manner to the movable element of the potentiometer 65.

When normal plate current flows through the electromagnets 41 and 42 both brake mechanisms 79 and 80 will be engaged to lock the frames 77 and 78 to the disk 81. In this condition, the disk and frames cannot rotate, since the two frames are connected by the links 77' and 78' to the longitudinally slidable operating member 40. Should plate current increase from the normal value which maintains both brake mechanisms 79 and 80 engaged, the electromagnet 41 would overcome the brake-engaging effect of the magnet 82 to release the brake mechanism 79 thus freeing the connection between the disk 81 and the frame 77 and permitting the disk 81 to rotate. The effect of increased current in the magnet 42 merely tightens the grip of the brake 80 in the disk 81, and as the disk rotates it therefore carries the frame 78 with it and moves the controlled member 40 upwardly. Such movement of the controlled member, transmitted to the frame 77 through its associated link 77', causes the frame 77 to swing in a direction opposite to that in which the disk 81 rotates. In addition, upward movement of the controlled member 40 adjusts the potentiometer 65 to decrease the frequency of the oscillator 25 and cause the plate current to decrease, in the manner above described, until the magnet 41 is incapable of overcoming the effect of the magnet 82, whereupon the brake 78 engages the disk 81 and prevents any further rotation thereof.

Should the plate current decrease from the value necessary to maintain both brakes 79 and 80 engaged, such decrease would be without any significant effect on the brake 79, which is held engaged by the magnet 82, but would partially de-energize the electromagnet 42 and release the brake 80. The disk 81 is thereby freed for rotation; and in its rotation it carries the frame 77 with it to move the controlled member 40 downwardly causing an adjustment of the potentiometer 65 which, by increasing the frequency of the oscillator 25, eventually causes the plate current to increase until the brake 80 is again engaged.

It is to be understood that the mechanism illustrated in Figs. 7 and 8 is shown and described merely by way of example and that my invention is not limited to any specific mechanism for converting changes in plate current into movement of a controlled member and re-adjustment of the local oscillator 25.

To take account of delay in operation of the mechanism controlled by the electromagnets 41 and 42, a resistance 68 may be connected between the B+ source and the potentiometer 65, and a condenser 69 may be connected between the plate of tube 22' and the low-potential terminal 68' of the resistance 68. With such an arrangement, the resistance 68 functions in somewhat the same manner as does the resistance 21 in Fig. 1; that is, it causes a change in plate current to create a change in the potential to which the condenser 59 attempts to charge, and by so doing it changes the frequency of the oscillator 25. Accordingly, upon a change in plate current caused by a change in the frequency of the control signal, the frequency of the oscillator 25 will be changed substantially immediately to match the new frequency of the control signal, whether or not the mechanical system responds with sufficient speed to effect that result. In other words, except where the change in frequency of the control signal proceeds with such extreme slowness that the mechanical system alone accounts for the matching change in the frequency of the oscillator 25, the changed frequency of such oscillator will be due at least in part to an abnormal potential at the point 68', which abnormal potential will in turn be due to abnormal plate current. However, any such condition is transient in character, both because the abnormal plate current causes further adjustment of the potentiometer 65 and because the condenser 69, as a result of its effect on the potential at point 68' and the effect of that potential in the frequency of the oscillator 25, tends to maintain an abnormal plate current until the potential at the point 68' returns to its normal value and the new frequency of the oscillator is due entirely to adjustment of the potentiometer 65. As a result, even though the frequency of the oscillator 25 may be brought into agreement with the changed frequency of the control signal more rapidly than can be caused by movement of the controlled member 40 and readjustment of the potentiometer, movement of the controlled member 40 and readjustment of the potentiometer 65 continues until the changed frequency of the oscillator 25 is entirely accounted for by potentiometer-readjustment. When this stage is reached, the plate current will have again attained its normal value and the controlled member 40 will occupy the position determined for it by adjustment of the corresponding control member 35 at the transmitting station.

Figure 9:
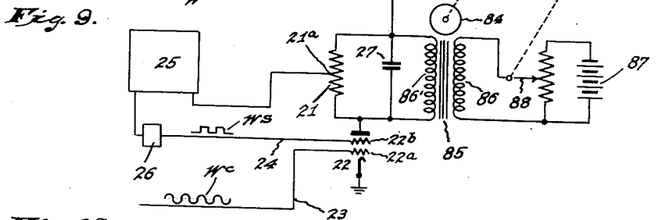
Figs. 9 and 9$a$ are diagrammatic views illustrating modified forms of remote-control receiver.

In Fig. 9 I have illustrated a remote-control receiving system which differs somewhat from that illustrated in Figs. 5 to 8. In this system, the element to be remotely controlled is the rotor 84 of a servo-motor 85 having two field windings 86 and 86' arranged to oppose each other in their effect on the rotor 84. The field winding 86 is energized by a suitable current source 87 under the control of a potentiometer 88 which is operatively connected in any convenient manner, as indicated diagrammatically by dotted lines in Fig. 9, to the rotor 84. The field winding 86' is shown as replacing the milliammeter 20 and resistance 20' in the system of Fig. 1.

In the device just described, the position of the rotor 84 will be a function of the current flowing in the field winding 86'; for upon any change in such current, the rotor will rotate and adjust the potentiometer 88 until the current in the winding 86 just counterbalances that in the winding 86', whereby to bring the rotor to rest. As was brought out in the discussion of Fig. 1, the stable-state plate current in the tube 22 will have a different value for each frequency of the control signal. Since current in the winding 86' will be proportional to such plate current, the rotor 84 will have a different position for each frequency of the control signal, and by varying the frequency of the control signal the position of the rotor 84 can be controlled as desired.

Reverting to Figs. 2, 3, and 4, it will be apparent that maximum plate current will flow when the two signals $W_c$ and $W_s$ are in phase with each other or nearly so and that minimum plate current will flow when the two signals are displaced in phase by 180° or thereabouts. In the systems of Figs. 1 and 9, the frequencies corresponding respectively to maximum and minimum plate currents determine the limits of the frequency band within which the frequency of the control signal $W_c$ may vary while the system remains operative.

Figure 13:
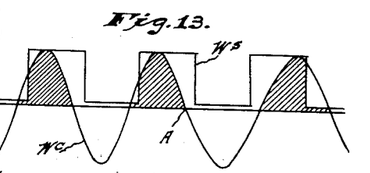
Figs. 13 to 16 are curve diagrams explanatory of some general aspects of my invention.

Another condition limiting the width of such frequency band is indicated in Fig. 13. Since the joint controlling effect of the two signals $W_c$ and $W_s$ is exerted only during intervals in which both of them are positive, any phase displacement occurring when one or both signals are negative is without any immediate effect on plate current. It is conceivable that in the interval between successive periods in which both signals are positive, the signal $W_c$ could undergo a change in frequency sufficient to reverse the normal controlling effect. Fig. 13 illustrates a stable-state condition terminating at time A. During the existence of the stable-state condition, the signal $W_c$ has a slight lead over the signal $W_s$. At the point A, which marks the termination of a period in which both signals are positive, it is assumed that the signal $W_c$ undergoes a decrease in frequency sufficient to reverse its phase displacement relative to the signal $W_s$ and to increase the absolute value of such displacement at the next period in which both signals are positive. In such a case, the immediate effect of the changed frequency of the control signal would be to decrease plate current, as is indicated by the fact that the third shaded area in Fig. 13 is smaller than either the first or second. This decrease in plate current, occurring in any of the systems described, would, either directly or indirectly, tend to increase the frequency of the signal $W_s$. That is, the frequency of signal $W_s$, instead of changing in the same sense as that of signal $W_c$, would change in the opposite sense and the system, if operative at all, would be highly erratic.

To avoid the occurrence of any such a condition the band of frequencies over which the control signal $W_c$ is variable may be restricted to such an extent that the signal $W_c$ can never, within one cycle, shift from a leading to a lagging phase relationship with respect to the signal $W_s$. With symmetrical signals, and depending to some extent on wave-form, such a result is substantially attainable by limiting to one-fourth the mean frequency the extent to which the frequency of the signal $W_c$ can depart in either direction from such mean frequency. If at the nominal frequency the signal $W_c$ leads the signal $W_s$ by 90°, and if the frequency of $W_c$ can not depart by more than one-fourth from its nominal value, no decrease in the frequency of $W_c$, no matter how abrupt, can cause it to change from a leading to a lagging phase relationship within one cycle.

Figure 14:
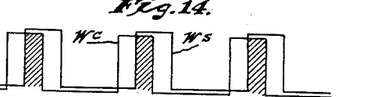

When both of the signals $W_c$ and $W_s$ are symmetrical, as they have been assumed to be above, plate-current can be changed from its maximum to its minimum value, or vice versa, by a change of 180° in the phase relationship of the two signals. As just brought out, the range of change in phase relationship of the two signals can be restricted to 180° by limiting to one-fourth of the nominal frequency the extent to which the frequency of the control signal can depart, in either sense, from such nominal frequency. In other words, if the signals are symmetrical, and if it is desired to utilize the full range of plate-current variation, the band width throughout which the frequency of the control signal is variable should be substantially one-half the mean frequency of that signal. In Fig. 14, I have illustrated asymmetric signals $W_c$ and $W_s$ of square wave-form comprising positive pulses each of approximately 90° in extent. It will be obvious from that figure that the full range of plate-current variation can be attained within a 90° change of phase displacement. That is, if the two signals are in phase, maximum plate current will be passed; but if the two signals depart from in-phase relationship by 90° there will be no periods during which both signals are positive, and therefore plate current will be at a minimum. As the change in control-signal frequency necessary to produce a 90° shift in phase displacement is obviously less than that required to produce a 180° shift, it follows that asymmetric signals permit the band-width of the control signal to be reduced without reducing the range of plate-current variation.

Figure 15:
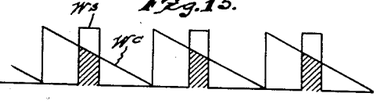

Fig. 15 illustrates a combination of wave forms in which the phase displacement may be greater than 180°. As there shown, the signal $W_c$ has a saw-tooth form, while the signal $W_s$ has an asymmetric square wave form. With such wave forms, the phase displacement may vary through an angle equal to the difference between 360° and the angular measure of the duration of the positive pulses of $W_s$; and the band-width allocated to the signal $W_c$ must be accordingly enlarged if the full range of plate-current variation is to be obtainable.

It can be demonstrated that the rapidity with which a receiving system adjusts itself to a given change in the frequency of the control signal is a function of the band-width necessary to obtain immediately the full range of plate-current variation. Specifically, the narrower such band width, the more rapidly will the receiving system respond. It follows from the above discussion of Fig. 14 that by decreasing the proportionate duration of the positive pulses of asymmetric signals the band width can be reduced without reducing the rate at which the system responds to a given change in control-signal frequency. If the signals are of square wave form, the total band width bears the same ratio to the mean frequency as the duration of each positive pulse bears to the period of a full cycle. While the rapidity with which the receiving system adjusts itself to a given change in signal frequency can be preserved while reducing the band-width, the increase in the asymmetric character of the signals which is necessary to permit the reduction in band-width causes a reduction in the duration of the periods in which both signals are positive and a consequent reduction in average plate-current. The reduction in plate current can be prevented to some extent by increasing the amplitude of the signals; but there are practical limitations upon the benefits obtainable by increasing signal-amplitude.

Figure 16:
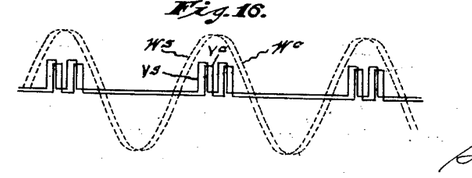

In Fig. 16 I have indicated an expedient by which the reduction in plate current which, as just set forth, normally accompanies a reduction in band width, can in some measure be avoided without the necessity for an undue increase in amplitude. In the practice of that expedient, plate current is controlled not directly by the joint effect of the two signals $W_c$ and $W_s$, but instead is controlled jointly by two auxiliary signals $V_c$ and $V_s$. The signals $V_c$ and $V_s$ are conveniently such as might be produced by multivibrators having a frequency several times the normal frequency of the signals $W_c$ and $W_s$ and arranged to be triggered respectively by the latter signals. The output of such a multivibrator would consist of groups of positive pulses, the duration and spacing of the pulses in each group being determined by the characteristics of the multivibrator and the frequency of the groups being determined by the frequency of the triggering signals. For simplicity of illustration, Fig. 16 shows each signal $V_c$ and $V_s$ as comprising but two positive pulses per group; but it will be understood that the number of pulses per group may be increased to three or more.

In a system employing the expedient indicated in Fig. 16, the band width of the signal $W_c$ necessary to vary plate-current throughout its entire range will depend upon the duration of each positive pulse of the signals $V_c$ and $V_s$; and as there are a plurality of such pulses per cycle of the control signal, the duration of each will necessarily be relatively small. As a consequence, a narrow band width for the signal $W_c$ will permit the full range of variation in plate current. Because there are a plurality of the positive pulses of the signals $V_c$ and $V_s$ per cycle of the signals $W_c$ and $W_s$, instead of but one as in Fig. 14, the amplitude of the signals $V_c$ and $V_s$ can be reduced while still maintaining average plate current within the desired range.

Figure 10:
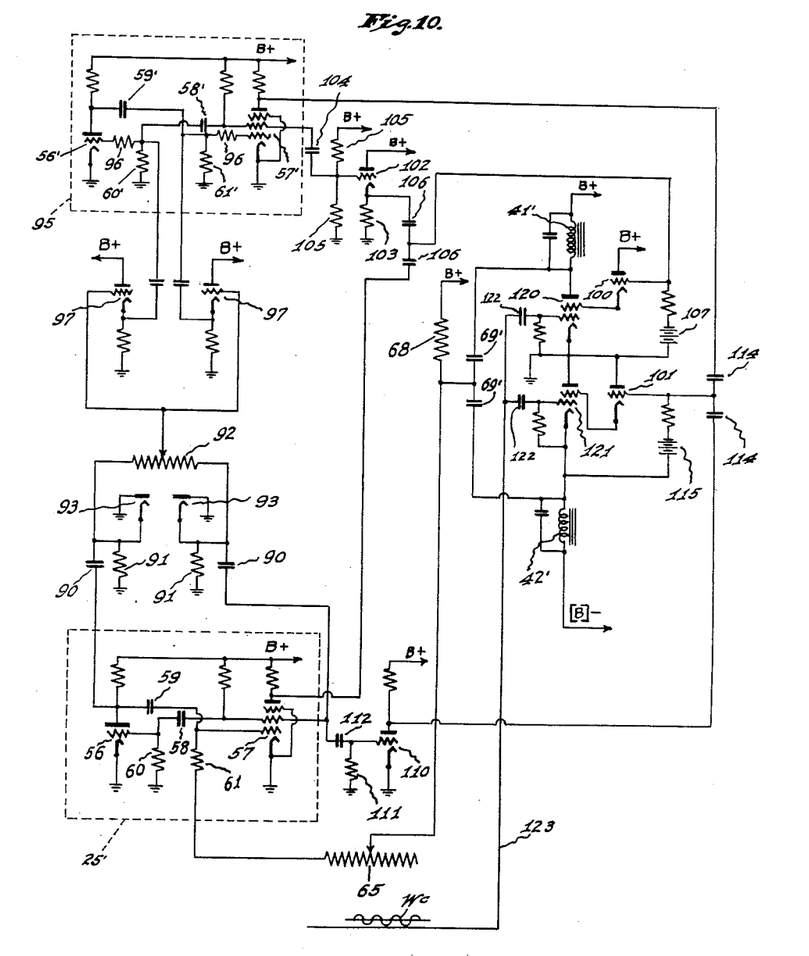
Fig. 10 is a diagrammatic view illustrating still another remote-control receiver.

In both the systems so far described, stable-state conditions are characterized by the existence of plate current. In some situations, it may be desired that no plate current flow under any stable-state condition; and a receiving system possessing that advantage is illustrated in Fig. 10. That system embodies a multivibrator 25' generally similar to and embodying the same principal elements as the multivibrator 25 previously described. As in Fig. 6, one of the frequency-controlling resistances 60 and 61 of the multivibrator is connected to the B+ source in series with the adjustable potentiometer 65 and the fixed resistance 66, so that the frequency of the current generated by the mutlivibrator 25' may be adjusted by the potentiometer 65. The function of the multivibrator 25' is somewhat different from that of the multivibrator 25; and in order to enable it to carry out that function in the manner contemplated, its nominal frequency is twice that of the nominal frequency of the control signal.

The plate of the triode 56 of the multivibrator 25' and the screen grid of the pentode 57 are each connected to ground through a condenser 90 and resistance 91 arranged in series, as indicated in Fig. 10. The ungrounded terminals of the resistances 91 are connected respectively to opposite ends a resistor 92 and to the cathodes of rectifying diodes 93 whose plates are grounded. The condensers 90 and their respectively associated resistances 91 serve to convert the substantially square wave generated by the multivibrator 25' into a series of alternating positive and negative peaks, the latter being passed to ground through the diodes 93 and the former being impressed in alternating relation on the opposite terminals of the resistance 92. As a result, the potential at the midpoint of the resistor 92 intermittently and briefly swings positive at a frequency twice that of the oscillator 25'.

The peaks of positive potential occurring at the midpoint of the resistance 92 are employed to trigger and modify the frequency of a multivibrator 95 the nominal frequency of which is one-half that of the multivibrator 25' and therefore the same as the nominal frequency of the control signal. The multivibrator 95 comprises a triode 56', a pentode 57', condensers 58' and 59', and resistances 60' and 61'. The multivibrator 95 also includes resistances 96 in series with the grid of the triode 56' and the control grid of the pentode 57'. The peaks of positive potential occurring at the midpoint of the resistance 92 are imposed on the grids of the tubes 56' and 57' through isolator tubes 97 and the resistances 96. As will be apparent to those skilled in the art, the effect of the peaks of positive potential imposed on the grids of the tubes 56' and 57' is to maintain the multivibrator 95 at a frequency equal to one-half the frequency of the multivibrator 25' when the latter frequency varies from its nominal value.

The substantially square-wave signals produced respectively by the oscillators 25' and 95, the former signal having twice the frequency of the latter, are combined to product first and second asymmetric signals which are impressed respectively on the grids of the two triodes 100 and 101. The apparatus employed to form the first asymmetric signal comprises a triode 102 arranged as an isolator and cathode follower and having its plate connected to the B+ source and its cathode grounded through a resistance 103. The grid of the triode 102 is connected through a condenser 104 to the screen grid of the pentode 57' in the oscillator 95 and is also connected to the midpoint of a voltage divider 105 connected between the B+ source and ground. The cathode of the triode 102 and the plate of the pentode 57 in the oscillator 25' are connected through identical condensers 106 with the grid of triode 100, and the mean potential of the grid of triode 100 is maintained at cut-off as by a biasing battery 107.

Figure 11:
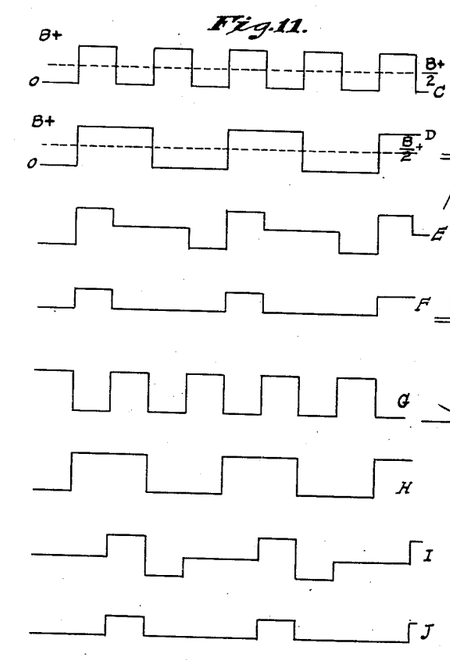
Figs. 11 and 12 are curve diagrams illustrating the operation of the system shown in Fig. 10.

The net effect of the apparatus just described is indicated in curves C, D, and E of Fig. 11, curve C representing the alternating potential of the plate of the pentode 57, curve D indicating the alternating potential of the cathode of triode 102, and curve E representing the resultant asymmetric signal applied to the grid of triode 100. The horizontal axis of each of the curves C and D is at a potential equal to one-half the B+ potential, while the horizontal axis of curve E is at the cut-off potential of the grid of triode 100 as a result of the presence of the battery 107. When both condensers 106 pass positive pulses, the potential of the grid of tube 100 rises above cut-off; when both condensers pass negative pulses, the potential of the grid drops below cut-off; and when one condenser passes a positive pulse and the other a negative pulse, the grid remains at cut-off potential. As a result, plate current in the tube 100 is as represented by the curve F in Fig. 10, the frequency of the positive pulses being equal to the frequency of the oscillator 95 and their duration being equal to one-fourth the period.

To produce the second asymmetric signal I employ a triode 110 which serves both as an isolator and to invert the alternating potential of the screen grid of the pentode 57 in the oscillator 25'. The cathode of tube 110 is grounded, while the anode is connected through a resistance to the B+ source. The potential applied to the grid is that existing across a resistance 111 connected in series with a condenser 112 between the screen grid of triode 57 and ground. The plate of tube 110 and the plate of the pentode 57' in the oscillator 95 are connected through identical condensers 114 with the grid of the triode 101.

The effect produced by the apparatus just described is indicated by the curves G, H, and I of Fig. 10. The curve G is the same as the curve C except for its inversion, the curve H is the same as the curve D, and the curve I is both inverted and displaced in phase with respect to the curve E. The mean potential of the grid of tube 101 is maintained at cut-off by a battery or other voltage source 115; with the result that the fluctuating grid-potential represented by the curve I causes plate current as represented by the the curve J to flow in the tube 101. It will be noted that the curve J is identical with the curve F except that curve F leads curve J by one-fourth their common period.

The respective plate currents in the triodes 100 and 101 are employed jointly with the control signal to regulate the operation of tetrodes 120 and 121 in each of which the two grids function as control grids. The cathode of tube 120 is grounded, while its plate is connected through an electromagnet 41' to the B+ source. The tube 121 is reversely connected, its plate being grounded and its cathode being connected through an electromagnet 42' to a source of negative potential equal in absolute value to the B+ source. One grid of the tube 120 is connected to the cathode of tube 100, one grid of tube 121 is connected to the cathode of tube 101, and the other grids of the two tubes are connected through condensers 122 to a conductor 123 over which the control signal Wc is transmitted. The plate of tetrode 120 and the cathode of tetrode 121 are connected through condensers 69' with the low-potential terminal of the resistance 68.

The mechanical means employed in association with the electrical system of Fig. 10 to effect automatic adjustment of the potentiometer 65 and movement of a controlled member may be one such as is illustrated in Fig. 10a. As will be evident from that figure, the device is essentially the same as that shown in Figs. 7 and 8 except for the addition of an electromagnet 82' arranged to oppose the effect of the electromagnet 42' on the brake mechanism 80.

Figure 12:
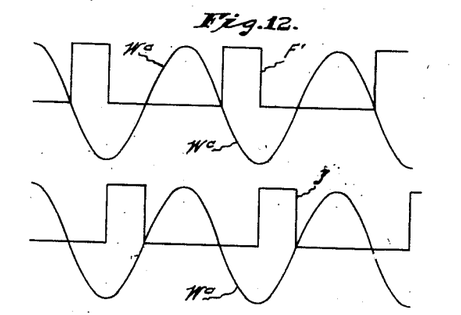

In Fig. 12, the curve F', which corresponds to the curve F of Fig. 11, represents variations in the potential of the screen grid in the tetrode 120; the curve J', which corresponds to the curve J of Fig. 11, represents variations in the potential of the screen grid of the tetrode 121; and the curve Wc indicates the control signal, which is impressed upon the control grids of both the tetrodes 120 and 121. Fig. 12 illustrates a stable-state condition in which the variable voltages F' and J' both have the same frequency as the control signal Wc, the two grids of each of the tetrodes 120 and 121 are never above cut-off potential at the same time, no plate current flows in either tetrode, and the magnets 41' and 42' are de-energized. In this condition, the electromagnets 82 and 82' of Fig. 10a operate to hold both brake mechanisms 79 and 80 engaged, and the disk 81 therefore remains stationary as do also the controlled member 49 (Fig. 8) and the adjustable element of the potentiometer 65. This stable-state condition exists as long as no change occurs in the frequency of Wc.

In the stable-state condition shown in Fig. 12, the voltage J' leads the signal Wc, which in turn leads the voltage F'. A decrease in the frequency of Wc will cause a progressive wave-to-wave decrease in its phase displacement relative to the voltage F', with the result that there occur intervals of increasing duration in which both grids of the tetrode 120 are above cut-off potential. As a result, plate current flows through the tetrode 120 and through the electromagnet 41'. The tetrode 121 is not immediately affected by a decrease in the frequency of the signal Wc because, as is clear from Fig. 12, such a change would effect a progressive increase in the phase-displacement of Wc relative to J' and would not result in the occurrence of intervals in which both grids of the tube 121 are simultaneously above their cut-off potentials. Accordingly, although a decrease in the frequency of the signal Wc will energize the electromagnet 41' (Fig. 10a) it will not energize the electromagnet 42'. Energization of the magnet 41' releases the brake 79 while the brake 80 remains engaged, the disk 81 is permitted to rotate to carry the frame 78 with it, and the controlled member 49 and the potentiometer 65 are moved to decrease the frequency of the oscillator 25' and with it the frequency of the voltages F' and J'. Eventually, a new stable-state condition is attained in which the controlled member occupies a new position.

Upon an increase in the frequency of the signal Wc following the existence of a stable-state condition, the resultant wave-to-wave change in phase displacement of the voltages Wc and J' creates intervals of progressively increasing duration in which the grids of the tetrode 121 are both above cut-off potential, with the result that plate current flows through the tetrode 121 and the electromagnet 42'. An increase in the frequency of the control signal Wc has no immediate effect on the tetrode 120, as it effects a progressive increase of the phase displacement of the signal Wc relative to the voltage F'. Accordingly, the electromagnet 42' is energized to release the brake 80, the electromagnet 41 remains de-energized to retain the brake 79 in engagement, and the adjustable element of the potentiometer 65 moves with the controlled member to increase the frequency of the oscillator 25' and eventually to cause the existence of a new stable-state condition at the higher frequency.

In the system of Fig. 10, each of the condensers 69' functions with the resistance 68 in the same way as does the condenser 69 in the system of Fig. 6, to accommodate for lag in the operation of the mechanical system and to expedite the attainment of a new stable-state condition following a change in frequency of the control signal. In addition, these condensers prevent the flow of direct current through the magnets 41' and 42' from the source of positive B voltage to the source of negative B voltage.

Figure 9A:
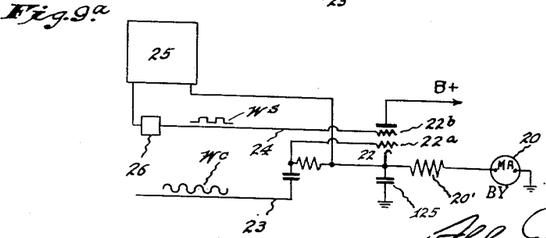

The receiving circuit shown in Fig. 9a is similar to that of Fig. 1 except for the location of the milliammeter 20 and 20' which, in this instance, are connected in series with each other across a condenser 125 interposed between ground and the cathode of the tetrode 22. The control signal $W_c$ and the local signal $W_s$ are impressed respectively on the grids 22a and 22b of the tetrode 22, and hence jointly control plate current as in the system of Fig. 1. Because of the impedance 125, the potential of the cathode of the tetrode 22 will vary with variations in plate current and may be employed to control the frequency of the local oscillator 25. Specifically, an increase in plate current, caused by a relative shift of the signals $W_c$ and $W_s$ toward an in-phase relationship, will increase the potential of the cathode.

If the oscillator 25 in the system of Fig. 9a responds to variations in control voltage as do the corresponding oscillators of the other systems described—i. e., if its frequency varies in the same sense as the control voltage—the local signal $W_s$ will lead the control signal $W_c$ in any stable-state condition. If the frequency of the control signal increases, the successive waves of the two signals will progressively shift toward the in-phase relationship to increase plate current and hence increase the potential of the cathode of tetrode 22; and as such cathode-potential controls the frequency of oscillator 25, the frequency of the local signal will increase until it matches that of the control signal, and establishes a new stable-state condition characterized by a new phase relationship of the two signals, a new plate current, and a new reading of the milliammeter 20. In the other systems illustrated, in which an increase in plate current causes a decrease in the potential controlling the frequency of the local signal, the control signal leads the local signal in any stable-state condition. In any of the systems, if the local oscillator were arranged so that its frequency varied in a sense opposite to that of the control voltage, the stable-state phase relationship of the two signals would be reversed.

The receiving systems described above, although employing the same fundamental principle, operate in two different ways. In the systems of Figs. 1 and 9, the frequency of the local signal $W_s$ is controlled by the average current in the plate circuit of the tube 22, and for every different frequency of the control signal there is therefore a different average, stable-state plate current. In the systems of Figs. 6 and 10, however, where the frequency of the local signal is controlled by an adjustable potentiometer, the average, stable-state plate current is the same for all frequencies. In the former type of system, the frequencies respectively determined by the minimum and maximum attainable plate currents mark the limits of the band over which the frequency of the control signal can be varied. In the other type, if the rate at which the frequency of the control signal can be varied is adequately limited, the range of variation is limited only by the range of adjustment of the device which controls the frequency of the local signal. However, if the rate at which the frequency of the control signal can be varied is unlimited, then the width of the band over which such frequency can be varied is limited by the necessity of preventing the occurrence of a condition such as is illustrated in Fig. 13.

It is to be noted that the response of the receiving apparatus to a signal transmitted to it is substantially unaffected by variations in amplitude or harmonic distortions of such signal. This is so because the actual control signal is not the transmitted signal itself, but is instead a signal of equal frequency generated by a local oscillator whose output is of substantially constant amplitude. Generation of the actual control signal by an oscillator located at the receiving station but controlled in frequency by the transmitted signal, makes it possible to employ a control signal which has a different wave form from that of the transmitted signal. As brought out above, control signals of asymmetric square wave form have advantages in certain situations; but, in general, a transmitted signal of sine wave form is preferred to others because any other form requires a band width sufficient to admit at least one harmonic of the fundamental frequency of the transmitted signal.

The explanations of operation set forth above contain an assumption that the oscillators respectively generating the local and control signals are without any effect on each other. Actually, such is not the case. Referring to Fig. 6, for example, the presence of the condenser 69 and the use of a common B+ source for the oscillators 25 and 46 tend to result in synchronization of these oscillators. Such a tendency can be increased, decreased, substantially eliminated, or even shifted in phase, when desired, as by introducing a slight signal from the plate of tube 53 to the control grid of tube 56 or 57 through an appropriate resistance-capacity network. Some inherent tendency of the oscillators 25 and 46 to synchronize is desirable, for it stabilizes operation of the mechanical system. However, the greater the tendency toward synchronization the greater will be the change in the frequency of the transmitted signal required to produce a response at the receiving station.

I have referred to my invention above as utilizing signals whose frequency is of the order of that of audio-frequency signals. It is not to be understood from this, however, that the frequencies which can be employed are limited to those of audible sounds.

I claim as my invention:

1. In a remote control system, a rotatable disk, means biasing said disk for rotation in one direction, a controlled member reciprocable along a path arranged generally radially with respect to the axis of disk rotation, a pair of members mounted for movement circumferentially of said disk and on opposite sides of said radial path, links connecting said last-named members to said controlled member, brake means releasably connecting each of said pair of members with said disk and biased toward engaged condition, electromagnetic means for selectively releasing said brake means, and means responsive to movement of said controlled member for controlling said electromagnetic means to cause engagement of said brake means.

2. In a frequency-responsive receiver for use in a remote-control system, a variable-frequency oscillator, an electron discharge device having a cathode, a pair of control grids and an anode, an anode circuit for said device, said cathode, anode and grids being so arranged and said control grids so biased that the potential of each grid can limit current in the anode circuit to a minimum irrespective of the potential on the other grid whereby current will flow in the anode circuit only during intervals when both grids are above their respective cut-off potentials, means for impressing an incoming signal on one of said control grids, means for impressing on the other control grid the signal produced by said oscillator, and means responsive to the current flowing in said anode circuit for controlling the frequency of said oscillator.

3. The invention set forth in claim 2 with the addition of a movable member, and means responsive to the current in said anode circuit for moving said member.

References Cited in the file of this patent

UNITED STATES PATENTS

| Number | Name | Date |
|---|---|---|
| 1,897,204 | Loewe | Feb. 14, 1933 |
| 2,176,742 | La Pierre | Oct. 17, 1939 |
| 2,280,019 | Alexandersson et al. | Apr. 14, 1942 |
| 2,342,816 | Peek | Feb. 29, 1944 |
| 2,395,575 | Mitchell | Feb. 25, 1946 |
| 2,396,091 | De Bey | Mar. 5, 1946 |
| 2,398,419 | Finison | Apr. 16, 1946 |
| 2,410,523 | Rankin | Nov. 5, 1946 |
| 2,429,771 | Roberts | Oct. 28, 1947 |
| 2,466,583 | Dillman | Apr. 5, 1949 |
| 2,487,678 | Stickel | Nov. 8, 1949 |
| 2,557,581 | Triman | June 19, 1951 |